Aug. 11, 1942.  E. G. ANGER  2,292,812
ARC PREVENTION SWITCHING SYSTEM
Filed May 12, 1939  5 Sheets-Sheet 3
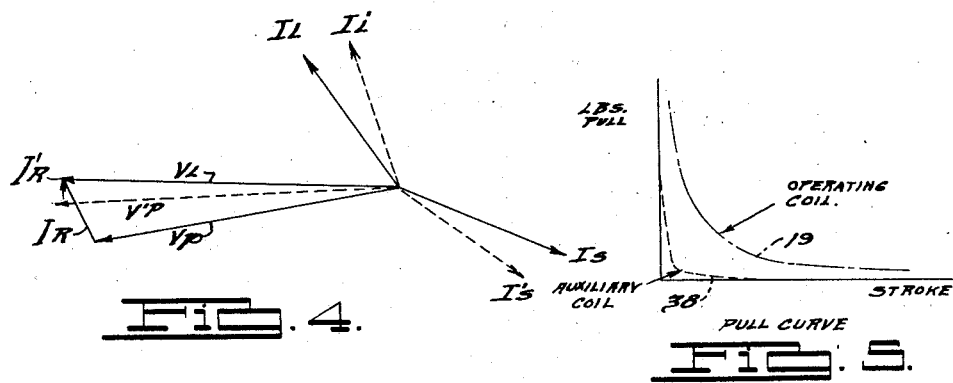
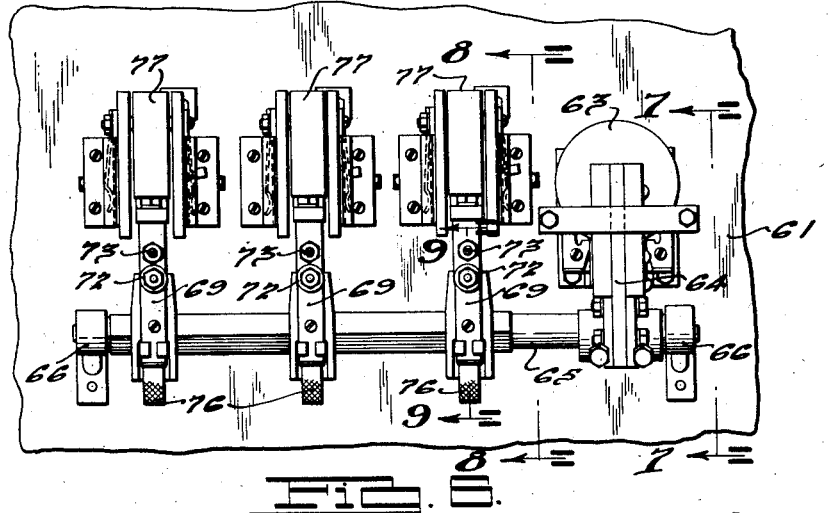
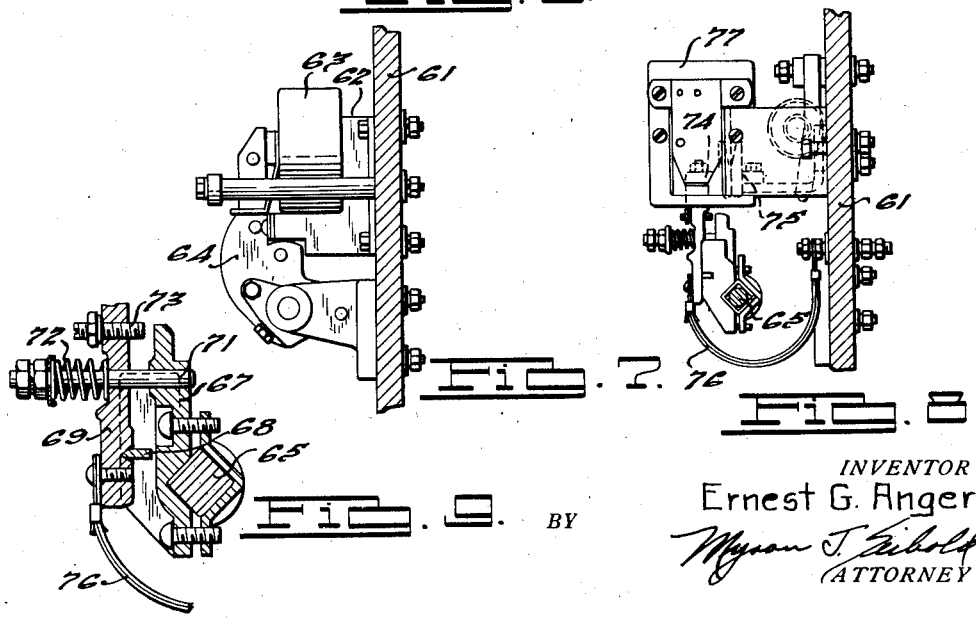
INVENTOR
Ernest G. Anger
BY
ATTORNEY Aug. 11, 1942.    E. G. ANGER    2,292,812
ARC PREVENTION SWITCHING SYSTEM
Filed May 12, 1939    5 Sheets-Sheet 4
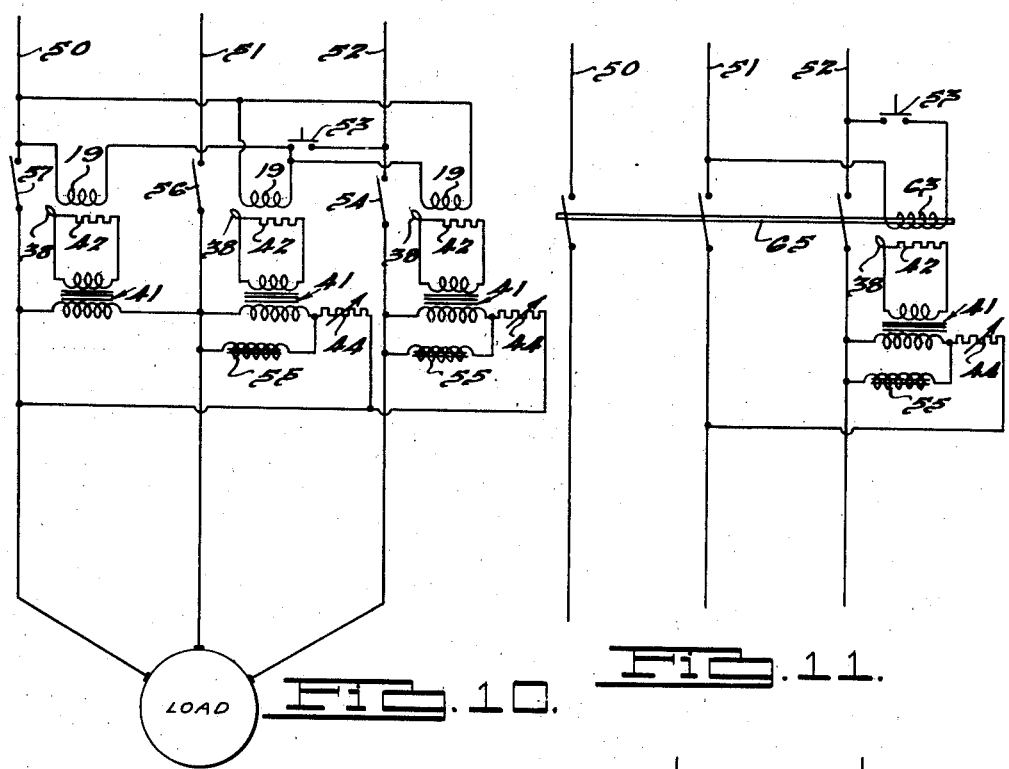
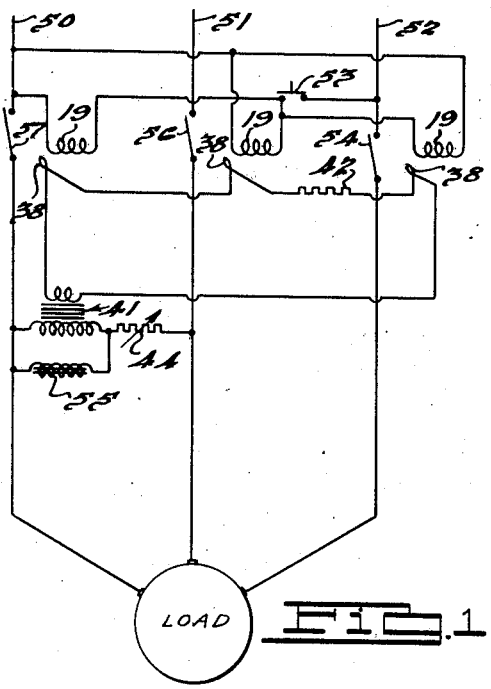
INVENTOR
Ernest G. Anger
ATTORNEY INVENTOR
Ernest G. Anger
ATTORNEY Patented Aug. 11, 1942

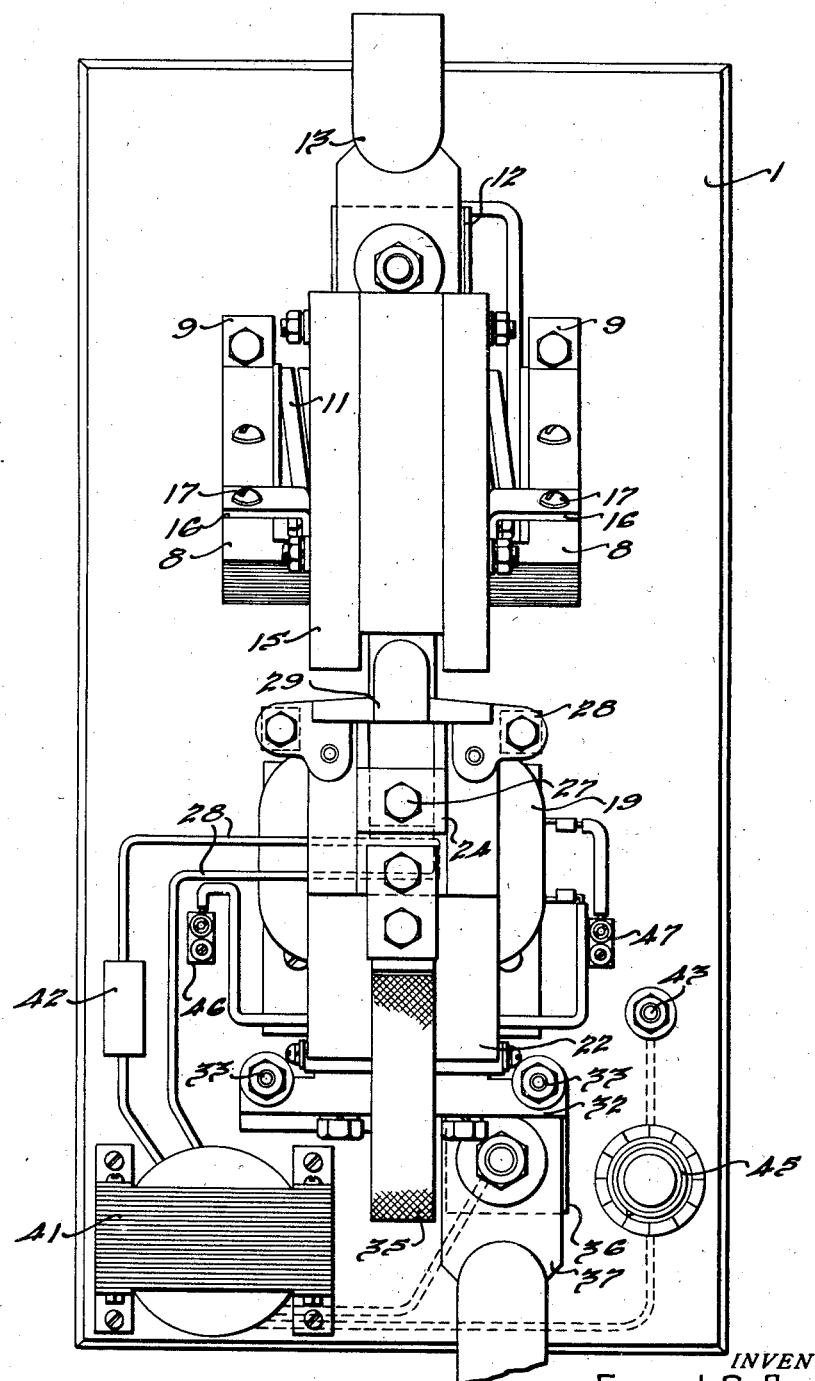

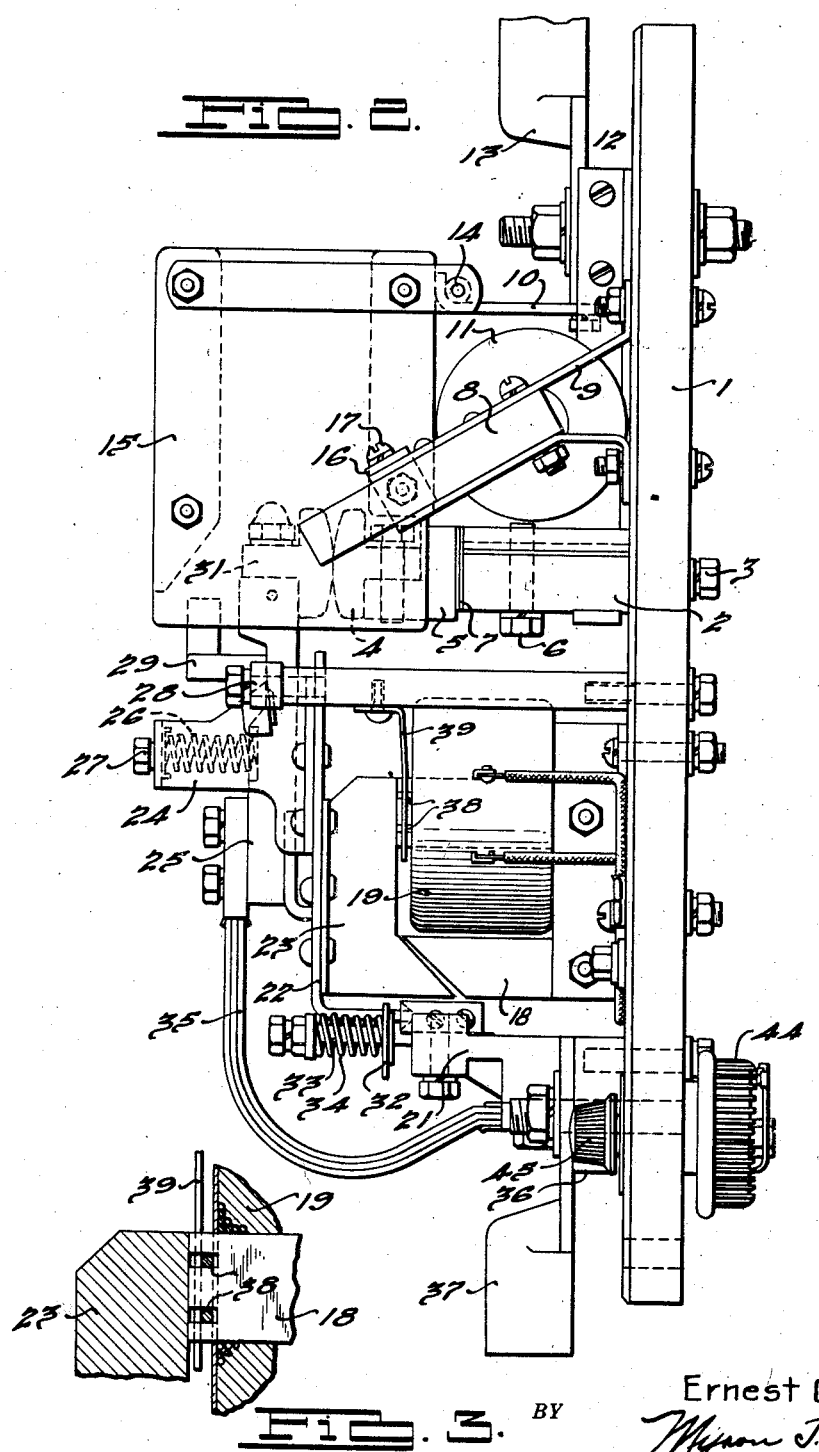

2,292,812

UNITED STATES PATENT OFFICE 2,292,812

ARC PREVENTION SWITCHING SYSTEM

Ernest G. Anger, Wauwatosa, Wis., assignor to Square D Company, Detroit, Mich., a corporation of Michigan Application May 12, 1939, Serial No. 273,289

7 Claims. (Cl. 175—294)

This invention relates to electric circuit controlling means and represents an extension or further development of my invention described and claimed in my application, Serial No. 204,052 filed April 25, 1938, for Electric switch.

In my application above cited there has been disclosed and claimed an electric switch and circuit controlling system for the opening of a single phase contactor or contactors so that the circuit controlling contacts will be operated at a predetermined point on the reference supply voltage or current wave.

It is the object of the present invention to provide circuit controlling means for multiphase circuits providing for opening of the circuits of the individual legs or phases at predetermined points on the reference supply wave.

Another object of the invention is to provide an electric circuit controlling means for a multiphase system in which the circuits through the various legs of the system are opened when the currents therein have instantaneous values of substantially zero.

Another object of the invention is to provide an electric circuit controlling means for a multiphase system which shall operate to successively break the circuits through the various legs of the system with a time interval determined by the phase angles between the currents to be interrupted and in which the circuit opening occurs at a definite predetermined point on the supply wave, such as when the current has an instantaneous value of substantially zero.

Other objects and features of the invention will be readily apparent to those skilled in the art from the following specification and the appended drawings illustrating certain preferred embodiments of the invention in which:

Figure 1 is a front elevational view of an electromagnetically operated single pole switch described and claimed in the previous application and utilized in one embodiment of the present invention.

Figure 2 is a side elevational view of the switch shown in Figure 1.

Figure 3 is an enlarged detailed sectional view of an armature and field magnet pole face showing the synchronizing coil.

Figure 4 is a simplified vector diagram illustrating the phased relations between the various factors leading to the synchronization of the switch.

Figure 5 is a graph showing typical hold curves for the operating and auxiliary coils of an electromagnetic contactor.

Figure 6 is a front elevational view of a multipole contactor outlined in another embodiment of the invention.

Figure 7 is a vertical sectional view on the line VII—VII of Figure 6.

Figure 8 is a vertical sectional view on the line VIII—VIII of Figure 6.

Figure 9 is an enlarged detailed sectional view on the line IX—IX of Figure 6.

Figure 10 is a schematic diagram of the multiphase circuit controlling system using single pole contactors.

Figure 11 is a similar schematic diagram using a multipole contactor.

Figure 12 is a schematic diagram similar to Figure 10, but with a different synchronizing arrangement.

Figure 13 is a schematic diagram of an alternative method of energizing the auxiliary or synchronizing coil on the contactor.

Figure 14:
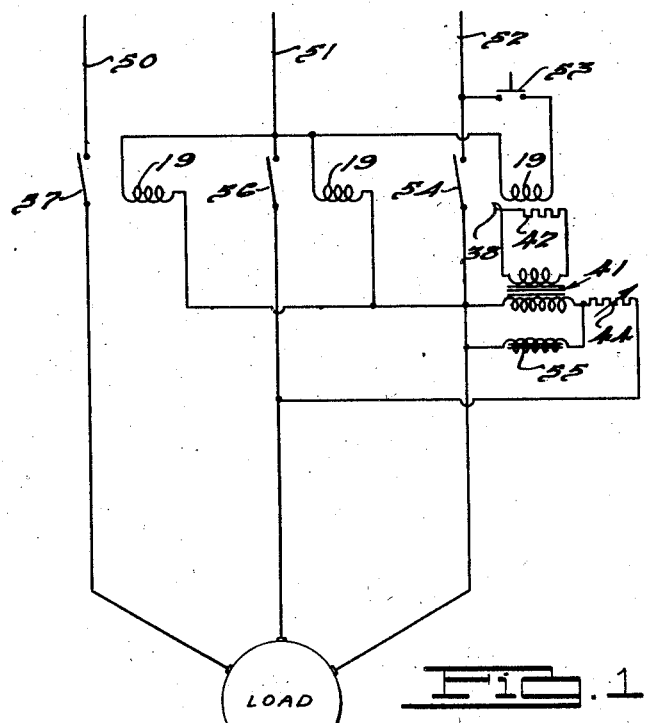
Figure 14 is a schematic diagram similar to Figure 10 but with only a single one of the single pole contactors directly synchronized and with the other two interlocked therewith.

The single pole synchronized contactor illustrated in Figures 1 to 3 of the drawings comprises supporting plate 1 having mounted on its front face the stationary contact supporting post 2 as by means of a stud 3. The stationary contact 4 is removably mounted upon a holder 5 adjustably and releasably supported upon the post 2 by means of a stud 6. Spacing shims 7 are provided between the holder 5 and post 2 for adjusting the position of the stationary contact 4 with respect to the supporting plate 1. Above the stationary contact supporting assembly is supported a C-shaped magnet 8 supported upon the plate 1 by a pair of brackets 9 at opposite sides of the stationary contact. Around the magnet 8 is disposed a blowout coil 11 having one end connected to the contact post 2 and its opposite end connected to a terminal 12 to which the terminal lug 13 may be connected. A bracket 10 is rigidly mounted on the panel 1 and receives in supporting relation a pin 14 rigid with an insulating arc chute 15 having its lower portion disposed about the stationary contact 4 and the movable contact cooperating therewith. A pair of angle brackets 16 are rigidly secured to the opposite sides of the arc chute 15 and are attached to the brackets 9 by the studs 17. The hook and pin 13 and 14 and the brackets 16 combine to support the arc chute 15 in its operative position.

Rigidly supported upon the panel 1 below the contact post 2 is a U-shaped stationary field magnet 18 having wrapped about its upper leg the main operating coil 19. Below the field magnet 18 there is rigidly mounted upon the panel 1 a supporting bracket structure 21 having at its front face a V-shaped notch providing a bearing for a pivoted operating member 22 which has mounted thereon a magnetic armature member 23. On the front face of the pivoted operating member 22 is rigidly secured a generally U-shaped spring bracket and contact finger guide 24 having disposed between its legs the contact finger 25 and a compression spring 26 bearing against the contact finger and providing the resilient contact pressure in the "on" position of the switch. A stud 27 is provided for adjusting the tension of the spring 26 for a purpose to be hereinafter described. The contact finger 25 is pivotally mounted on operating member 22 and in the "on" position of Figure 2 the operating member 22 is moved to the right with respect to the finger so that in the separating movement of the contact the member 22 will have an appreciable movement toward the left before it rigidly engages the contact finger and moves it to its "off" position. Rigidly supported on the panel 1 are stop posts 28 having a stop 29 mounted thereon for determining the de-energized extreme position of the moving parts. A movable contact 31 is removably mounted on the upper end of the finger 25 in position to cooperate with the stationary contact 4 within the arc chute 15. A bracket 32 is rigidly mounted upon the bottom leg of the operating member 22 and a pair of fixed posts 33 have compression springs 34 thereabout which bias the member 22 to its extreme deenergized position. A flexible conductor 35 interconnects the contact finger 25 with the lower terminal 36 on the panel having connected thereto the leg 37 for reception of the circuit conductor.

The auxiliary holding coil is represented in the drawings as a single turn of the wires 38 which is disposed in a pair of horizontal transverse milled slots in the front of the upper pole face of the field magnet 18. A pair of angle members 39 have their shorter legs rigidly connected to the posts 28 and their free ends extended at opposite sides of the pole face and bear against the turn formed by the conductor 38 to maintain it in place within the slots. This pole face construction is more particularly shown in the enlarged detailed view of Figure 3. It is, of course, understood that while the turn has been illustrated as being located in the stationary pole face, since it is easier to thus connect it to a stationary part, insofar as the working of the switch is concerned, it could be connected in the armature pole face, although here, due to the moving part, flexible connections or some other means connecting the coil into its auxiliary circuit would have to be provided. The conductors 38 forming the auxiliary coil or turn are fed from the secondary of the transformer 41 and include a limiting resistor 42 in series therewith. One side of the primary of the transformer 41 is connected to the terminal 36 and the opposite side is connected to a terminal 43 through which the transformer 41 is connected to the other side of the circuit. An adjustable resistance 44 having adjusting knob 45 at the front of the panel 1 is placed in series with one leg of the primary of the transformer 41 for a purpose to be hereinafter explained. The opposite ends of the main operating winding 19 are led to terminals 46 and 47 on the front face of the panel at which points they may be connected in the control circuit.

The operation of this single pole contactor may be understood from a consideration of one of the single pole contactors connected as shown in Figure 10. In this figure the line wires are indicated at 50, 51 and 52, and the load, such as a three-phase electric motor, is connected thereto through the single pole connectors 54, 56, and 57, each in one of the legs of the circuit. In the arrangement of Figure 10, the operating coils 19 of the contactors are connected in parallel to the supply through a control means indicated as a push button 53, it being understood that the diagrammatic representation indicated at 53 may be any type of controlling switch or push button station involving any desired arrangement of start and stop switches, interlocks, etc., its function being the energization and deenergization of the operating coils of the contactors. The auxiliary or synchronizing turn 38 of the contactors are connected through the resistors 42 to the secondaries of the transformers 41 as previously described. The primary windings of the transformers 41 are connected across certain of the legs of the supply (at load sides of the contactors) through the adjustable resistances 44, except in the case of the contactor 57 where this resistance has been shown as omitted, although it could be included if desired. The transformers 41 of the contactors 56, 57 are shown as connected across the legs 50 and 51 while that of contactor 54 is shown as connected across the legs 50, 52. It is obvious that these transformers may be otherwise connected, it being only necessary that a contactor to be later synchronized be not connected to a leg which was previously opened. In the connection arrangement of Figure 10, the contactor 54 is designed to open first and the contactors 56 and 57 thereafter. Impedances 55 are connected in parallel with the primary windings of the transformers 41 of contactors 44, 46, but such impedance is not needed in the contactor 57 although it may be supplied if desired. As explained in my previous application, the impedances 55 are not essential and a high leakage transformer could be used and, in fact, the leakage reactance of the transformer or the impedance 55 could be made adjustable to secure phase displacement.

The operation of a single pole contactor, as shown in Figures 1 to 3 and connected as shown in Figure 10 will now be described.

When the operating coil 19 is energized, the armature 23 will be attracted thereto and the operating member 22 will rotate about its knife edge pivot in the support 21. This will bring the movable contact 31 into engagement with stationary contact 4 and will cause the operating member 22 to be moved forwardly relative to the contact finger 25 to stress the compression spring 26 and thus place a resilient bias upon the contact finger which maintains the contact pressure. Upon deenergization of the operating coil 19, and leaving out for the moment the operation of the coil formed by the turn 38, the armature will be released and will move toward its separated position under the action of the springs 34 and the contact pressure spring 26, as well as by the force of gravity. When operating member 22 re-engages the contact finger 25, the contact 31 will separate from the stationary contact 4 and continued movement of the contact and operating member will be effected through the action of gravity and the biasing springs 34. The current through the contactor flows from the terminal 12 through blowout coil 31, contact finger 25 and flexible lead 35 to the terminal 36. Passage of current through the blowout coil 31 creates a flux within the blowout magnet 8 whose pole faces are spaced at opposite sides of the cooperating contacts and the field between the pole faces tends to blow out any arc which might be formed between the contacts.

In the operation so far described, the switch has been of ordinary conventional function; however, now taking into consideration the action of the auxiliary holding coil formed by the turn of conductors 38, a local field is produced by this coil or turn between the cooperating pole faces on the armature 23 and stationary field magnet 18. This local field does not extend around the full magnetic path through the armature and field magnet, but is strictly a local field embracing only the magnetic circuit formed immediately adjacent the coil and through the pole faces. This field will be strong enough to hold the armature in place while the field has an appreciable value; but, when the field approaches its zero value, it will release the armature and permit it to move forwardly with the operating member 22. The local magnetic circuit formed at the upper pole faces has no appreciable air gap, so that the slightest separation of the armature from the field magnet introduces a large reluctance into this local magnetic circuit; therefore, as the flux produced by the coil or turn 38 tends to build up in the reverse direction, it will not be sufficiently strong to pull the armature back into place, but the armature will continue to move forwardly into its released position. Since the coil is energized from the same source as supplies the welding contactor, and since the coil produces a sufficient local flux to prevent separation of the armature until the flux produces its zero value, it is apparent that the armature will always start to separate at a definite point on the supply wave, regardless of the point in this wave at which the main operating coil 19 is de-energized. So far, therefore, we have the initial separation of the armature 23 from the field magnet 18 definitely synchronized with the supply voltage.

After the armature separates from the field magnet, it and the operating member 22 must move forward some distance before the operating member engages the contact finger 25 to cause the contact 31 to separate from contact 4. The time interval between initial separation of the armature from the field magnet and initial separation of the contacts will be referred to hereinafter as the time constant of the contactor. From the point on the voltage wave at which the armature starts to separate and the time constant of the contactor, it is apparent that we have a definite point on the voltage wave at which the contacts start separating and the circuit is interrupted. The final result which it is desired to synchronize with the supply voltage or current waves is, of course, the initial separation of the contacts. Without changing the time constant for the contactor, the point of initial separation of the contacts may be shifted along the supply wave by varying the value of the resistance 44 in the primary of the transformer 41 as will be explained hereinafter with respect to the simplified vector diagram of Figure 4. However, if the point of separation of the armature is not made adjustable, or if the limiting values of the resistor 44 do not give the desired result, then the time constant of the contactor can be changed to vary the point on the wave at which the contacts separate. This can be done in several ways. The springs 26 can be adjusted by means of the stud 27 to have a greater or lesser tension, and hence, increase and lessen the speed of dropout of the operator 22, or, of course, these springs may be entirely replaced with springs of different strengths. Also, the biasing springs 34 may be adjusted to increase or decrease the spring bias, tending to move the operator 22, and these springs also could, of course, be entirely replaced. Also, the gap between the contact finger 25 and the operator 22 in the "on" position of the switch can be increased or decreased by the addition or removal of the shims 7 which determine the position of the stationary contact 4. By any one of these mechanical adjustments, it is apparent that the time constant of the contactor is changed and by proper selection of these mechanical adjustments the point of opening of the contacts can be shifted along the supply waves with respect to the point of initial opening of the armature 23.

With the contactor connected as shown in Figure 10, the synchronization of the contactor opening from the determining of the point from armature unsealing and the time constant of the contactor will really synchronize the opening of the contacts with the supply voltage wave. However, assuming a substantially uniform power factor for the load, this will mean also the synchronization of contact opening with the current wave. In the cases where the power factor of the load varies over a wide range so that synchronization of the contact opening with the supply voltage would not produce the desired result of synchronization of contact opening with the current wave, the arrangement shown in Figure 13 may be used. Here the potential transformer 41 is replaced by a current transformer 58 which energizes the auxiliary turn 38 through limiting resistor 42 in response to the current flow through the leg of the circuit in which it is included.

The arrangement of Figure 13 has several disadvantages inasmuch as there is the possibility that with a very large current through the transformer 58 a current of sufficient magnitude will be passed through the coil 38 as to always hold the armature in place; also there is the probability of the contactor being noisy or chattering unless a load were placed on it; however, where large variations in power factor occur and it is desired to synchronize with the load current, the current transformer energization would probably be preferred. Synchronization could be secured by adjustment of the time constant of the contactor or by varying the air gap in the iron circuit of the current transformer to secure a limited phase displacement of the secondary current.

Figure 4 shows a simplified vector diagram in which $V_p$ indicates the voltage applied to the primary of the transformer 41. $I_s$ indicates the secondary current flowing through the auxiliary coil formed by conductor 38. $I_L$ indicates total current flowing through the circuit which includes the transformer 41 and impedance 55 in parallel with each other and in series with the variable resistor 44. The dotted line vector positions, $I_L'$, $I_s'$, $V_p'$, represent the relative positions of these variables when the resistance 44 is lowered in value. It is readily apparent that such lowering lessens the resistance drop through the variable resistor and, hence, increases $V_p$ slightly and moves it closer to the base vector $V_L$ representing the line voltage into the position shown as $V_p'$. This also results in rotating the secondary current vector $L$ into the position $L'$ which has changed, therefore, its position with respect to the reference voltage vector $V_L$, the line voltage. This secondary current $L$ is flowing through the conductor 38 and is thus producing the auxiliary flux which holds the armature in place until its value approaches zero; hence, the rotation of this current vector with respect to the line voltage also rotates the auxiliary flux vector with respect to the line voltage and changes the point on the line voltage wave at which the armature unseals. Therefore, it is apparent that adjustment of a resistor 44 will vary the point on the supply voltage wave at which the armature 23 unseals and, assuming that the time constant of the contactor or switch is not changed, will move the point of opening of the contacts and breaking of the circuit along the supply voltage wave. Hence, by variation of resistor 44, it is possible to select the point on the voltage wave at which the contacts are separated. Assuming a constant or average power factor, this will also determine the point on the supply current wave at which the contacts will separate.

The variations attainable by this adjustment are, of course, limited and, for very large variations in the point at which the contacts separate, it may become desirable to change the time constant of the contactor or switch, as previously described, by one or more of the mechanical adjustments.

Figure 5 has been added to the drawings to indicate the relative operation of the main operating coil 19 and of the auxiliary coil 38. A small air gap is usually maintained at one of the pole faces of the magnetic circuit, in this case the lower angular pole face, so that the main magnetic circuit will not be sealed. The upper pole faces will be permitted to seal so that the auxiliary local magnetic path for the auxiliary coil 38 will have a very low reluctance while the main magnetic circuit will have an appreciable reluctance. This means that a very slight unsealing of the upper cooperating pole faces of the armature and field magnet will reduce the pull exerted by the auxiliary coil to an inappreciable value. This illustrates why, when once the armature has started to drop out, it will not be again pulled in as the flux produced by the auxiliary coil builds up in the reverse direction. The pull curve of Figure 5 also illustrates that the main operating coil has an appreciable pull even when the operating stroke of the operator 22 or the air gap is quite large so that the main operating coil may function to pull the armature into its energized position.

Figures 6 to 9 inclusive illustrate a multipole contactor which may have its armature unsealing synchronized as in the single pole contactor shown in Figures 1 to 3. This contactor may otherwise be of conventional construction providing it incorporates means for adjusting the time constants of the individual sets of contacts. As shown, the multipole contactor comprises a supporting panel 61 having thereon a field magnet 62 provided with an energizing coil 63. An armature 64 is rigidly attached to a shaft 65 pivoted in spaced bearings 66. The separate poles of the multipole contactor are identical in construction and include an operating element 67 rigidly secured to shaft 65. The elements 67 are generally U-shaped in cross section and in the opposite sides thereof are disposed knife edge fulcrums 68 to which pivot the contact fingers 69. Spring guides 71 are rigidly mounted on the element 67 and extend loosely through the contact fingers 69 and are provided with compression springs 72 biasing the fingers 69 for clockwise rotation on the fulcrums 68, as viewed in Figure 9. Adjustable stop screws 73 are provided which cooperate with the upper end of the element 67 to determine the normal spacing between the contact finger and the elements 67. Movable contacts 74 are mounted on the ends of the fingers 69 and these are adapted to cooperate with stationary contacts 75 supported on posts mounted on the panel 61. Flexible leads 76 interconnect the contact fingers 67 with suitable terminals on the panel 61. Arc chutes 77 are provided to enclose the cooperating contacts. Due to the size of the Figures 6 to 9 the auxiliary operating coil has not been shown, but these figures are to be read in conjunction with Figure 3, it being understood that Figure 3 is equally representative of the pole face and armature construction of the magnet 62 and armature 64, as it is of the magnet 18 and armature 23 of the single pole contact.

The connection of the synchronized multiple contactor is illustrated in the schematic diagram of Figure 11, so it is seen that the contactor is equipped with the synchronizing coil 38 which is connected through the resistor 42 with the secondary of the transformer 41 whose primary is connected across two legs of the circuit through an adjustable resistor 44 and which has an impedance 55 in parallel with the primary of the transformer winding. From the previous description of the operation of the single pole contactor, it is obvious that provision is made in the multipole contactor described for synchronized unsealing of the armature 64. With the unsealing of the armature synchronized, it is apparent that the separation of the several poles may be individually synchronized by adjusting the individual time constants of each set of cooperating contacts. From an inspection of Figures 8 and 9, it is readily apparent that after unsealing of the armature 64, contacts 74, 75 will not separate until the upper ends of elements 67 engage the stop screws 73 on the contact fingers 69. Hence, an easy mechanical way of adjustment is provided by adjusting the position of the stop screws 73 to secure the desired time constants in the individual poles between unsealing of the armature and the separation of the contacts in the poles. It is, of course, readily apparent that it is necessary in a 3-phase contactor only to synchronize two of the poles since it is only necessary for the third pole to open after the other two and it need not be otherwise synchronized since the circuit is already dead at the time it opens. In this arrangement it is also permissible to omit the adjustment provided by the adjustable resistor 44 in conjunction with the impedance 55 since all adjustment may be made by means of the individual pole time constants. It is also readily apparent that other means for varying the time constants of the poles may be used as in the single pole contactor, such as variation in the position of the stationary contact fingers by means of the addition or removal of shims and by adjustments of springs.

However, the adjustment by means of the change in the gap between the stop screw 73 and the upper element of 67 is quite convenient, although the change in the position of the stationary contact might be made equally so with a change in the base mounting arrangement.

Specifically describing the arrangement shown in Figure 10, the synchronization of the individual single pole contactors is adjusted so that upon opening of the operating coils 19 of the contactors 54, 56 and 57, contactor 54 will open first and in the desired synchronization with the current in the leg 52; contactor 56 being synchronized so that it will open after contactor 54 and as soon as the current in leg 51 reaches the point at which synchronization is desired. In the synchronization of contactor 57, it is only necessary that its contacts open after the opening of contactor 56 which interrupted the current flow in legs 50 and 51. Since by this time no current is flowing, opening of contactor 57 need not be definitely synchronized.

In Figure 12 another arrangement has been shown in which the three individual single pole contactors are all of the synchronized form but have their synchronizing turns 38 fed in series (this could be just as readily in parallel) from the secondary of a single transformer 41 which has the usual phase displacement means provided therefor. In this arrangement the unsealing of the armatures of the three contactors occurs substantially simultaneously and it is necessary to synchronize the opening of the contacts by means of adjustment of the time constants of the individual contactors. This has the advantage over the system of Figure 10 in utilizing less equipment but makes the adjustment a little more difficult since it must be carried out mechanically instead of electrically. This adjustment of time constants can be accomplished by any of the means previously described in the single pole contactor of Figures 1 to 3.

Current transformer energization shown in the schematic diagram of Figure 13 has been previously described and it is understood that this energization may be substituted for the potential transformer energization in any of the systems shown in the other figures.

Figure 14 illustrates synchronized opening of the three phase circuit by means of one synchronized and two interlocked contactors. The contactor in the leg 52 is here synchronized in the manner previously described to effect the opening of the circuit through the line 52 at the desired point. The other two contactors have their operating coils interlocked with this contactor in line 52. This means that upon the opening of the control circuit for coil 19 of the contactor in line 52, the operating coils 19 of the other two contactors will remain energized until the circuit of line 52 is broken. By means of the synchronizing arrangement previously described, opening of the circuit through line 52 is synchronized with the supply; hence, the deenergization of the operating coils 19 of the other two contactors and the unsealing of their armatures will also be definitely synchronized with the supply wave. Accordingly, it is only necessary to adjust the time constants of the other two contactors to effect the synchronized breaking of the remaining circuit. Of course, it is really necessary to synchronize only one of the two contactors, it being only required that the unsynchronized contactor shall not open before the other. This system has the advantage over Figure 10 of simplicity of the equipment and the use of two standard contactors but has the disadvantage of mechanical adjustment in the second opening contact.

Figure 15:
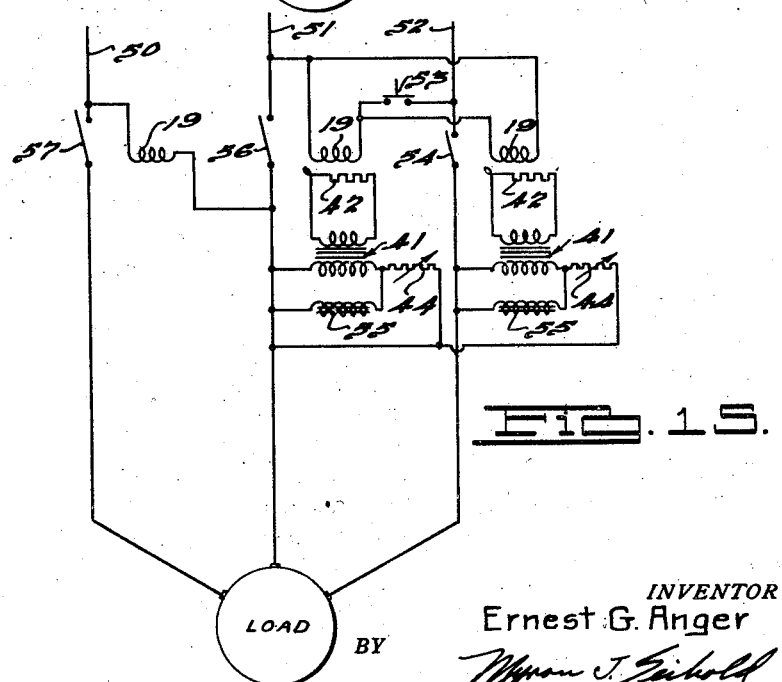
Figure 15 is a schematic diagram similar to Figure 10 but with the third single pole contactor interlocked instead of using the auxiliary coil.

In Figure 15 a further arrangement is shown which synchronizes two of the single pole contactors in the same manner as in Figure 10 and which employs a standard contactor for the third line which is interlocked with the second, openings of the third contactor being effected by having its operating coil connected to the load side of the second contactor. In this arrangement the contactors 56 and 54 in lines 51 and 52 are positively synchronized as described in connection with Figure 10, and the opening of line 51 deenergizes the operating coil of the contactor 57 in line 50 to effect the opening thereof, its synchronization being unnecessary in view of the fact that it does not interrupt any current. Insofar as the opening of the three phase circuits is concerned, the arrangement of Figure 15 is perhaps the simplest from the combined standpoint of material and adjustment inasmuch as it combines the easy adjustment of Figure 10 with a standard contactor instead of one using the synchronizing coil for the last line to open. However, the system of Figure 15 differs from Figure 10 in that the operating coils 19 of the contactors are not similarly energized as in Figure 10 but rather the contactor in line 51 must first close before the operating coil 19 of the contactor in line 50 is energized.

It is obvious that many other system arrangements can be utilized for both single and multipole synchronized contactor effects, including combinations of the two and various interlocking and synchronizing connections and it is to be understood that applicant's invention is not to be limited to the few systems which have been specifically disclosed herein; and, while certain preferred embodiments of the synchronizing arrangement have been specifically disclosed, as well as specific contactor construction in accordance with the requirements of the patent statutes, it is understood that the invention is not limited thereto and is to be given its broadest possible interpretation within the terms of the following claims:

What is claimed is:

1. In a multiphase alternating current system, a multiphase supply, a multiphase load, means for controlling the connection of said supply to said load including individually operable single pole electromagnetic contactors in each leg of the circuit, at least certain of said contactors having their operating coils interlocked with another of said contactors so that opening of said last mentioned contactor effects deenergization of the operating coils of said first mentioned contactor, said last mentioned contactor having an auxiliary synchronizing coil, and means energizing said auxiliary coil with alternating current bearing a definite phase relation with the supply waves, said auxiliary coil preventing initiation of said last mentioned contactor until the flux produced thereby has an instantaneous value of substantially zero after deenergization of the contactor operating coil whereby the opening of said last mentioned contactor is synchronized with the supply waves and, hence, the deenergization and opening of the first mentioned contactors will likewise be synchronized with respect to the supply waves.

2. In a multiphase alternating current system, a multiphase supply, a multiphase load, means for controlling the connection of said supply to said load including individually operable single pole electromagnetic contactors in each leg of the circuit, at least certain of said contactors having their operating coils interlocked with another of said contactors so that opening of said last mentioned contactor effects deenergization of the operating coils of said first mentioned contactor, said last mentioned contactor having an auxiliary synchronizing coil, means energizing said auxiliary coil with alternating current bearing a definite phase relation with the supply waves, said auxiliary coil preventing initiation of said last mentioned contactor until the flux produced thereby has an instantaneous value of substantially zero after deenergization of the contactor operating coil whereby the opening of said last mentioned contactor is synchronized with the supply waves, and, hence, the deenergization and opening of the first mentioned contactors will likewise be synchronized with respect to the supply waves, the phase relation of the energizing current of the auxiliary coil of the last mentioned contactor and the operating time of the contactor being such as to effect separation of the contacts of said last mentioned contactor when the current therethrough has an instantaneous value of substantially zero, the operating time of at least one of said first mentioned contactors being such that the contacts thereof will separate when the current therethrough has an instantaneous value of substantially zero.

3. In a multiphase alternating current system, a multiphase supply, a multiphase load, means for controlling the connection of said supply to said load including individually operable single pole electromagnetic contactors in each leg of the circuit, operating coils for said contactors adapted to be energized and deenergized to effect the operation thereof, at least certain of said contactors having auxiliary synchronizing coils, means energizing said auxiliary coils with alternating currents having definite phase relations with respect to the supply waves, said synchronizing coils preventing initiation of the opening movement of the contactors with which they are associated until the flux produced thereby has an instantaneous value of substantially zero after deenergization of the operating coil of the contactor, whereby the initiation of the opening movement of the contactors will be synchronized with respect to the supply waves, said phase relations and the operating times of the contactors being such as to effect separation of the contacts when the currents therethrough have an instantaneous value of substantially zero, the operating coil of any contactor which does not carry current after opening of the synchronized contactors being interlocked with a synchronized contactor so that its opening is effected after current has ceased flowing therethrough.

4. An electric switch comprising a plurality of relatively insulated sets of cooperating contacts, common means for effecting operation of the contacts to open and close the circuits therethrough, electromagnetic means in addition to said operating means for preventing the initiation of the opening movement until the flux therein has an instantaneous value of substantially zero after the operating means is actuated, means energizing said electromagnetic means with alternating current having a definite phase relation with respect to the supply waves, and means for independently adjusting the period between initiation of the opening movement and separation of each of the individual sets of contacts whereby each set of contacts may be separately synchronized with the supply waves.

5. An electric switch comprising a plurality of relatively insulated sets of cooperating contacts, common electromagnetic means for effecting the closing and opening movement of the contacts in response to energization and deenergization of an operating coil on said electromagnetic means, an auxiliary electromagnetic coil means energizing said auxiliary coil with alternating current having a definite phase relation with respect to the supply waves to be controlled, said auxiliary coil permitting initiation of the opening movement of the operating means only when the flux produced thereby has an instantaneous value of substantially zero, whereby the initiation of the opening movement is synchronized with respect to the supply waves irrespective of the point on the waves at which the operating coil is deenergized, and means for independently adjusting the period between initiation of the opening movement and the operation of each set of contacts whereby said contacts may be individually synchronized to separate at desired points on the supply waves.

6. Circuit controlling means for disconnecting a multiphase load from a multiphase supply substantially without arcing comprising a plurality of sets of contacts each connected in a leg of the circuit, common operating means for said contacts, means in addition to said operating means for synchronizing the initiation of the opening movement with respect to the supply waves, and means for independently adjusting the period between said initiation of opening movement and the separation of each set of contacts so that the contacts separate when substantially no current is flowing therethrough.

7. Circuit controlling means for disconnecting a multiphase load from a multiphase supply substantially without arcing comprising cooperating sets of contacts each connected in a leg of the circuit, common electromagnetic operating means for said contacts, auxiliary electromagnetic means, means energizing said auxiliary electromagnetic means with alternating current having a definite phase relation with the supply waves, said auxiliary electromagnetic means operating to prevent initiation of the opening movement of said operating means until the flux produced thereby has an instantaneous value of substantially zero after deenergization of said first mentioned electromagnetic means whereby the initiation of the opening movement will be synchronized with the supply waves, and means for independently adjusting the period between initiation of opening movement and separation of each set of contacts so that at least certain of said contacts will interrupt current passing therethrough when it has an instantaneous value of substantially zero, any contacts connected in a line which does not carry current after opening of the synchronized contacts being at least adjusted to open after such synchronized opening of the other contacts.

ERNEST G. ANGER.